United States Patent
Bergström et al.

(10) Patent No.: US 9,729,303 B2
(45) Date of Patent: Aug. 8, 2017

(54) METHODS AND APPARATUSES FOR CONTROLLING GLITCH BEHAVIOR IN A NETWORK

(71) Applicant: Telefonaktiebolaget L M Ericsson (publ), Stockholm (SE)

(72) Inventors: Mattias Bergström, Stockholm (SE); Magnus Stattin, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 111 days.

(21) Appl. No.: 14/438,143

(22) PCT Filed: May 24, 2013

(86) PCT No.: PCT/SE2013/050596
§ 371 (c)(1),
(2) Date: Apr. 23, 2015

(87) PCT Pub. No.: WO2014/077755
PCT Pub. Date: May 22, 2014

(65) Prior Publication Data
US 2015/0280890 A1    Oct. 1, 2015

Related U.S. Application Data
(60) Provisional application No. 61/725,663, filed on Nov. 13, 2012.

(51) Int. Cl.
*H04L 5/00* (2006.01)
*H04W 28/16* (2009.01)
(Continued)

(52) U.S. Cl.
CPC ........... *H04L 5/0098* (2013.01); *H04W 28/16* (2013.01); *H04W 72/005* (2013.01); *H04W 76/046* (2013.01); *H04W 88/02* (2013.01)

(58) Field of Classification Search
CPC .... H04L 5/0096; H04L 5/0098; H04W 28/16; H04W 72/005; H04W 76/046; H04W 88/02
See application file for complete search history.

(56) References Cited

U.S. PATENT DOCUMENTS

2011/0292854 A1* 12/2011 Terry ...................... H04L 5/001
370/311
2012/0178445 A1   7/2012 Dalsgaard et al.
2014/0112243 A1* 4/2014 Suzuki ............... H04W 76/048
370/328

OTHER PUBLICATIONS

European Search Report dated May 20, 2016 for European Application Serial No. 1 385 4761.7, European Regional Phase Filing Date: Apr. 28, 2015 consisting of 8-pages, Oct. 5, 2016.
(Continued)

*Primary Examiner* — Pao Sinkantarakorn
(74) *Attorney, Agent, or Firm* — Christopher & Weisberg, P.A.

(57) ABSTRACT

The embodiments herein relate to a method performed in a user equipment, a user equipment, a method performed in a network node and a network node for controlling glitch behavior of the user equipment. The method comprising: receiving a message from the network node. Determining if the message includes an indicator indicating if the UE shall perform a glitch at cell configuration or at cell activation, and performing the glitch depending on the indication received in the message.

24 Claims, 7 Drawing Sheets

(51) Int. Cl.
H04W 72/00 (2009.01)
H04W 76/04 (2009.01)
H04W 88/02 (2009.01)

(56) References Cited

OTHER PUBLICATIONS

3GPP TSG-RAN WG4 Meeting #70, Tdoc R2-103108, Source: Ericsson, ST-Ericsson, Title: "Explicit Uplink Activation/Deactivation", Document for Discussion and Decision, Agenda Item: 7.1.8, Montreal, Canada, May 10-14, 2010 consisting of 3-pages.

3GPP TSG-RAN WG4 Meeting #62bis, R4-121354, Source: Renesas Mobile Europe Ltd, Title: "Retuing Interruptions for CA Activation /Deactivation and Configuration/Deconfiguration", Document for Discussion, Agenda Item: 6.1.3.1, Jeju, Korea, Mar. 26-30, 2012 consisting of 5-pages.

3GPP TSG-RAN WG4 Meeting #62bis, R4-121486, Source: Qualcomm Incorporated, Title: "Interruptions at SCell Activation and Deactivation", Document for Discussion, Agenda Item: 6.5.1, Jeju, Korea, Mar. 26-30, 2012 consisting of 3-pages.

3GPP TSG-RAN WG4 Meeting #78, R2-122289, Source: InterDigital Communications, Title: "Handling of SCell Activation/Deactivation RF Retuning Interruptions", Document for Discussion and Decision, Agenda Item: 6.1, Prague, Czech Republic, May 21-25, 2012 consisting of 13-pages.

International Search Report and Written Opinion dated Mar. 21, 2014 for International Application Serial No. PCT/SE2013/050596, International Filing Date: May 24, 2013 consisting of 12-pages.

3GPP TSG-RAN2 #70bis R2-103963, Stockholm, Sweden Source: NTT DoCoMo, Inc., Title: "DL SCell Activation/Deactivation without Glitches", Document for Discussion and Decision, Agenda Item: 7.1.1.2, Jun. 28-Jul. 2, 2010 consisting of 5-pages.

3GPP TSG-RAN WG2 #70bis R2-104180, Stockholm, Sweden Source: Ran WG2, Title: "LS on SCell Activation/Deactivation", Release-10, Work Item: LTE_CA-Core, Jun. 28-Jul. 2, 2010 consisting of 2-pages.

3GPP TSG-RAN WG4 Meeting #56 R4-103110, Madrid, Spain. Source: Huawei, Title: "Discussion on UE RF Capability Parameters", Document for Discussion, Agenda Item: 8.3.1.2, Aug. 23-27, 2010 consisting of 3-pages.

3GPP TSG-RAN WG2 Meeting #79bis, R2-124699, Bratislava, Slovakia. Source: Samsung, Title: "Discussion on Glitch", Document for Discussion, Agenda Item: 6, Oct. 8-12, 2012 consisting of 3-pages.

* cited by examiner

Aggregated bandwidth of 100 MHz

METHODS AND APPARATUSES FOR CONTROLLING GLITCH BEHAVIOR IN A NETWORK

TECHNICAL FIELD

The technology described herein relates to a user equipment or terminal, a method thereof for performing a glitch; a network node and a method thereof for controlling glitch behavior of the UE or terminal.

BACKGROUND

Long Term Evolution (LTE) specifications from the $3^{rd}$ Generation Partnership Project (3GPP) support component carrier bandwidth up to 20 MHz. However, in order to meet the International Mobile Telecommunications Advanced (IMT-Advanced) requirements for (very) high data rates, the concept of carrier aggregation has been introduced to support bandwidths larger than 20 MHz. The carrier aggregation concept is illustrated in FIG. 1, where five component carriers, or cells, are illustrated, with 20 MHz bandwidth each. In the example of FIG. 1, the total bandwidth available to a mobile terminal is the sum of the bandwidths of the cells, i.e. 100 MHz.

Note that in the context of carrier aggregation, a component carrier also refers to a cell. Hence five components carriers as illustrated in FIG. 1 correspond to five cells.

A terminal or a user equipment (UE) may be configured with a subset of the cells offered by the network and the number of aggregated cells configured for one terminal or UE may change dynamically through time based on for example terminal traffic demand, type of service used by the terminal, system load etc. A cell which a terminal is configured to use is referred to as a serving cell for that terminal. A terminal has one primary serving cell (called PCell) and zero or more secondary serving cells (SCells), the term serving cell includes both the PCell and SCells. Which cell is a terminal's PCell is terminal-specific. The PCell is considered more important and for example some control signaling is handled via the PCell. Hence in case of five components carriers as shown in FIG. 1, the terminal may have one PCell and zero, one, two, three or four SCells. Some control signalling is handled via the PCell, the PCell is an important carrier for the terminal.

It should be noted that although there is a difference in meaning, for the sake of readability the term serving cell will herein and in some cases be replaced by the term cell.

Aside from that the concept of configuration of cells/carriers has been introduced the concept of activation has been introduced for SCells (not for the PCell). Cells may be configured (or deconfigured) using Radio Resource Control (RRC) signaling, which can be slow, and at least SCells can be activated (or deactivated) using a Medium Access Control (MAC) control element, which is much faster. Since the activation process is based on MAC control elements—which are much faster than RRC signaling—an activation/de-activation process can quickly adjust the number of activated cells to match the number that are required to fulfil data rate needed at any given time. Activation therefore provides the possibility to keep multiple cells configured for activation on an as-needed basis.

When a terminal or UE gets configured with a cell it may need to re-tune the radio frontend (RF) to cover the spectrum of the configured cell and to change the carrier frequency. Similarly, when a serving cell is de-configured the terminal may need to re-tune radio frontend so as to not cover the de-configured cell. As a consequence of radio frontend re-tuning the terminal may need to perform an interruption, or glitch, during which the terminal is not able to receive of transmit signals using that radio frontend. An example is shown in FIG. 2 and FIG. 3. In FIG. 2 the terminal is configured with Cell A and Cell B but not Cell C. This is indicated by "covered spectrum".

In FIG. 3, the terminal is configured with all 3 cells A, B and C. When also Cell C is configured the terminal may need to perform a radio frontend re-tuning and hence perform a glitch or interruption. Similarly with deconfiguration, if the terminal cell configuration is first as in FIG. 3 but at a later stage Cell C is deconfigured the terminal may retune the radio frontend to enter the configuration as in FIG. 2.

When a cell/carrier is activated or deactivated the terminal may also perform a glitch, similar to the case of configuration or deconfiguration.

A glitch may affect all or some of the serving cells of a terminal or UE. Which serving cells are affected by the glitch may depend on how the transceiver architecture looks like or is designed in the terminal and on which radio frontend the different cells are on. When a RF is retuned all serving cells that RF will be affected.

In this disclosure, when it is sometimes said that a terminal is performing a glitch (or similar) it is referred to that the terminal or UE is performing a retuning of one or more of its RF frontends.

Hence, in order for a terminal to be able to use a cell for transmission, the cell first needs to be configured for the terminal. At cell configuration, the terminal may need to perform a glitch, due to RF retuning. When a cell has been configured it needs to be activated before the terminal is able to use it for communication. Also at cell activation the terminal may need to perform a glitch, due to RF retuning.

It is currently discussed in 3GPP the duration of the glitch and it may, in some situations, be as long as 40 ms, which is a non-negligible period of time in this context. During a glitch the terminal or UE is, at least partially, unable to communicate with the network and hence user experience will be degraded as the throughput will be decreased, delay increased and services may be interrupted. So during a glitch, interruption is experienced.

SUMMARY

It is therefore an object of exemplary embodiments herein to obviate at least some the problems mentioned above.

According to an aspect of the present embodiments, there is provided a method performed in a user equipment (UE) for performing a glitch, the method comprising: receiving a message from a network node; determining if the message contains an indicator indicating whether the UE is allowed to perform a glitch at cell activation or at cell configuration; and, that being the case, performing a glitch at cell activation or at cell configuration depending on the indication in the received message.

According to another aspect of the present embodiments, there is provided a method performed in a network node for controlling glitch behavior of a UE the method comprising: deciding if the UE is allowed to perform a glitch at cell activation or at cell configuration; and that being the case, signaling a message to the UE, the message containing an indicator indicating whether the UE is allowed to perform a glitch at cell activation or at cell configuration.

According to another aspect of the present embodiments, there is provided a UE for performing a glitch, the UE comprising: a transceiver configured to receive a message from a network node; and processing circuitry configured to determine if the message contains an indicator indicating whether the UE is allowed to perform a glitch at cell activation or at cell configuration; and, that being the case, the processing circuitry is configured to perform a glitch at cell activation or at cell configuration depending on the indication in the received message.

According to another aspect of the present embodiments, there is provided a network node for controlling glitch behavior of a UE, the network node comprising processing circuitry and a transceiver. The processing circuitry is configured to decide if the UE is allowed to perform a glitch at cell activation or at cell configuration; and, that being the case, the transceiver is configured to signal a message to the UE, the message containing an indicator indicating whether the UE is allowed to perform a glitch at cell activation or at cell configuration.

An advantage achieved by the embodiments herein is to allow the network node to control when a terminal or UE is performing an RF retuning, i.e. during the cell configuration or the cell activation.

Another advantage is to know when the terminal or UE shall perform RF retuning. An advantage with this is to avoid scheduling a terminal or UE during the RF retuning.

Also if the network node knows that a terminal is refraining from performing a glitch that terminal can be scheduled. This will improve user experience by increasing throughput, reducing delay and avoiding service interruption.

Other advantages of the exemplary embodiments described in this disclosure will be presented in the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Briefly described, the exemplary embodiments disclosed relate to controlling when/if a terminal or UE shall perform a glitch or RF retuning. According to the embodiments the network node is configured to indicate to the UE or terminal if the UE or terminal shall perform a glitch at cell activation or at cell configuration. By said terminal is meant a mobile station or a UE or any user device capable to connect to or operate in a wireless communication system such as LTE (Long Term Evolution) or LTE-Advanced or IMT-Advanced etc. Also when it is said network node it may be any network node in the wireless communication system for example an evolved NB (eNB) or NodeB, eNodeB or a radio base station.

Figure 1:
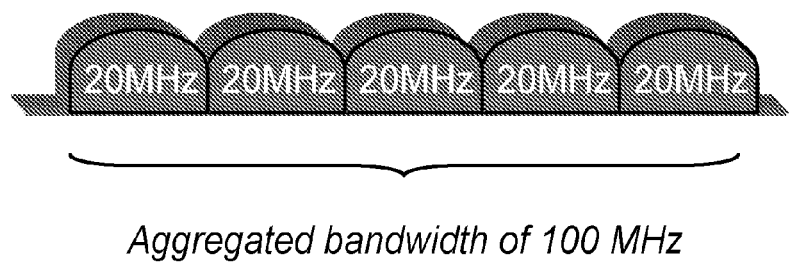
FIG. 1 is an illustrative example of an aggregated bandwidth or a CA configuration
Figure 2:
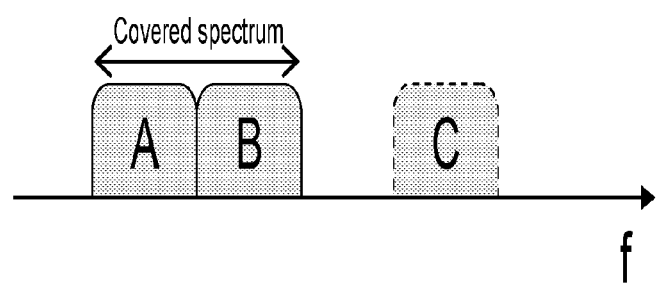
FIG. 2 is an illustrative example of configuration of cells/carriers to a terminal.
Figure 3:
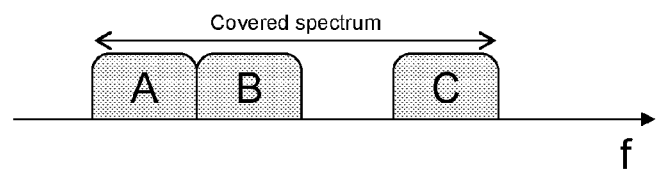
FIG. 3 is an illustrative example of another configuration of cells/carriers to a terminal.
Figure 4:
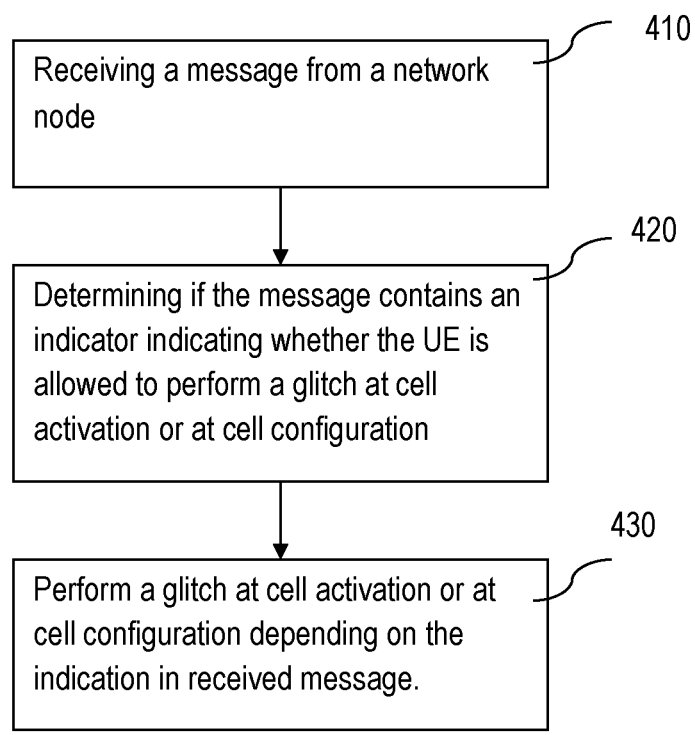
FIG. 4 is a flowchart of method, performed in a UE, according to exemplary embodiments herein.

FIG. 4 is a flow diagram depicting exemplary method steps performed by the terminal of UE in accordance with the present embodiments. As shown, the method comprises: receiving 410 a message from a network node; determining 420 if the received message contains an indicator indicating whether the UE is allowed to perform a glitch at cell activation or at cell configuration, and, that being the case, performing 430 a glitch as cell activation or at cell configuration depending on the indication in the received message. The received message may be a Radio Resource Control (RRC) message that contains the indicator.

In an exemplary embodiment involving the context of LTE this could for example be achieved by including an indicator flag in the RRC message used to configure (or "add") a cell. Example 1 below shows an example realization of the indicator signalled in an information element (IE) of the RRC message. The indicator can be viewed as a flag called glitchAllowedAtActivation and is shown comprised in the IE SCellToAddMod-r10. As shown the indicator may have a BOOLEAN value. As an example, if the indicator is set by the network node to true (or 1), this indicates to the terminal or UE that it is allowed to perform a glitch at activation. If the indicator is set by the network node to false (or 0) it indicates to the terminal or UE that it is not allowed to perform a glitch at activation of that cell.

It should be noted that the indicator may be optional to include, meaning that the network node may not include it when sending the cell configuration message if deemed suitable. If not included, the terminal or UE may perform a default action, e.g. perform RF retuning at cell configuration/activation.

The opposite mapping of the values of the indicator is also possible where the value false (or 0) indicates to the terminal that it is not allowed to perform a glitch at activation and if set by the network node to true (or 1) indicates to the terminal that it is allowed to perform a glitch at activation, however the indicator may then have a more suitable name.

```
SCellToAddMod-r10 ::=          SEQUENCE {
    sCellIndex-r10                 SCellIndex-r10,
    CellIdentification-r10         SEQUENCE {
        physCellId-r10                 PhysCellId,
        dl-CarrierFreq-r10             ARFCN-ValueEUTRA
    }
    OPTIONAL,    -- Cond SCellAdd
    radioResourceConfigCommonSCell-r10
    RadioResourceConfigCommonSCell-r10    OPTIONAL,    --
Cond SCellAdd
    radioResourceConfigDedicatedSCell-r10
    RadioResourceConfigDedicatedSCell-r10    OPTIONAL,    --
Cond SCellAdd2
    glitchAllowedAtActivation             BOOLEAN,
    ...
}
```

Example 1: Example Realization of Indicator Signalled in RRC Message or in a Cell Configuration Message As previously described the indicator may indicate whether the UE is allowed to perform a glitch at cell configuration. In this case, the indicator flag may be called glitchAllowedAtConfiguration. Similarly to the above example, if the indicator is set by the network node to true (or 1), this indicates to the terminal or UE that it is allowed to perform a glitch at configuration. If the network node is set to false (or 0) it indicates to the terminal or UE that it is not allowed to perform a glitch at configuration of that cell. It should be noted that the indicator may be optional to include, meaning that the network node may not include it when sending the cell configuration message if deemed suitable. If not included, the terminal or UE may perform a default action, e.g. perform RF retuning at cell configuration.

With the above, only one glitch is performed either at cell configuration or at cell activation. It should be mentioned that the network node according to current specification does not know if the terminal performs a glitch at cell configuration or at cell activation and hence the prior art network node may need to assume that the terminal performs a glitch both at cell configuration and at cell activation and the network node may therefore refrain from scheduling the terminal both during cell configuration and during cell activation, which will negatively affect user experience due to for example reduced throughput and increased delay. Note that if the network node would have scheduled the terminal during the time when the terminal performs a glitch the terminal will anyway not be able to perform reception or transmissions on the effected cells.

Hence, the embodiments herein have the advantage that it is possible to only perform one glitch, i.e. either a glitch at configuration of a cell or a glitch at activation of a cell, allowing the network node to influence or control when the terminal performs glitches.

This may be used by the network node when performing scheduling of the terminal. For example, a first terminal may perform a glitch during cell activation and hence the terminal or UE is unable to communicate with the network node during the time of the glitch at cell activation. However, a second terminal may not perform a glitch during cell activation (e.g. the terminal has performed the glitch at cell configuration) and if the network node knows that this second terminal is not performing a glitch at cell activation the network may schedule this second terminal also during the time when a glitch normally would have been performed by the terminal at cell activation. Doing so will increase throughput and reduce delay.

Since it is the network node that is configured to control if a cell shall be configured/deconfigured and if a cell shall be activated/deactivated for a terminal the network node is most suitable to control when the terminal performs the RF tuning (or glitch).

According to yet another embodiment, the method performed by the terminal or UE comprises, determining if the indicator indicates whether the UE is allowed to perform a glitch at cell deactivation or at cell deconfiguration; and that being the case; performing a glitch at cell deactivation or at cell deconfiguration depending on the indication in the received message.

Considering the context of LTE this could for example be achieved by including an indicator flag in the RRC message. The indicator can be called glitchAllowedAtDeActivation.

As an example, if the indicator is set by the network node to true (or 1), this indicates to the terminal or UE that it is allowed to perform a glitch at deactivation of the cell. If the indicator is set by the network node to false (or 0) it indicates to the terminal or UE that it is not allowed to perform a glitch at deactivation of that cell.

The opposite mapping of the values of the indicator is also possible where the value false (or 0) indicates to the terminal that it is not allowed to perform a glitch at deactivation and if set by the network node to true (or 1) indicates to the terminal that it is allowed to perform a glitch at deactivation As mentioned above the indicator may indicate whether the UE is allowed to perform a glitch at cell deconfiguration. In this case, the indicator flag may be called glitchAllowedAtDeConfiguration. Similarly to the above example, if the indicator is set by the network node to true (or 1), this indicates to the terminal or UE that it is allowed to perform a glitch at deconfiguration. If the network node is set to false (or 0) it indicates to the terminal or UE that it is not allowed to perform a glitch at deconfiguration of that cell.

According to an embodiment, if the indicator indicates that the UE shall perform a glitch at cell deactivation, the UE is prohibited from performing a glitch at cell deconfiguration.

According to another embodiment, if the indicator indicates that the UE shall perform a glitch at cell deconfiguration, the UE is prohibited from performing a glitch at cell deactivation Hence, the embodiments herein have the advantage that it is possible to only perform one glitch, i.e. either a glitch at deconfiguration of a cell or a glitch at deactivation of a cell, allowing the network node to influence or control when the terminal performs glitches.

This may be used by the network node when performing scheduling of the terminal. For example, a first terminal may perform a glitch during cell deactivation and hence the terminal or UE is unable to communicate with the network node during the time of the glitch at cell deactivation. However, a second terminal may not perform a glitch during cell deactivation (e.g. the terminal has performed the glitch at cell deconfiguration) and if the network node knows that this second terminal is not performing a glitch at cell deactivation the network may schedule this second terminal also during the time when a glitch normally would have been performed by the terminal at cell deactivation. Doing so will increase throughput and reduce delay.

Since it is the network node that is configured to control if a cell shall be configured/deconfigured and if a cell shall be activated/deactivated for a terminal the network node is most suitable to control when the terminal performs the RF tuning (or glitch).

Note that a LTE terminal is according to current specification allowed to perform an RF tuning at cell configuration and at cell activation i.e. two RF tunings. According to embodiments herein, only one RF tuning is necessary which therefore renders one of the allowed RF retunings unnecessary which degrades the user experience.

Figure 5:
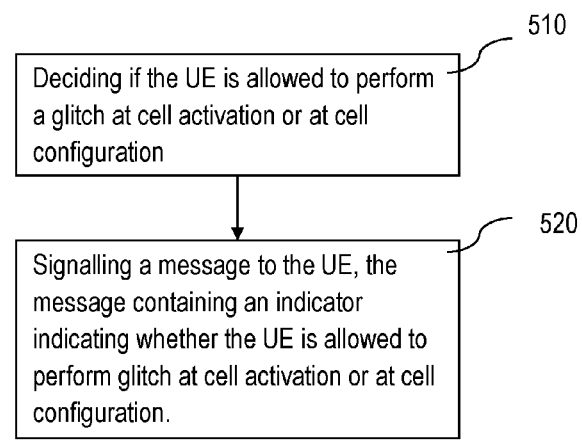
FIG. 5 is a flowchart of method, performed in a network node, according to exemplary embodiments herein.

FIG. 5 is a flow diagram depicting exemplary method steps performed by a network node in accordance with previously described embodiments. As shown in 510, the method comprises deciding if a terminal or UE shall perform a glitch at cell activation or at cell configuration; and, that being the case, sending/signalling 520 a message to the UE, the message containing at least one indicator indicating whether the UE shall perform a glitch at cell activation or at cell configuration depending on the decision taken by the network node.

According to an exemplary embodiment, the network node is configured to indicate if RF retuning (or glitch) is prohibited at cell configuration or at cell activation.

In this embodiment the network node is configured to sends/signals the indicator to the terminal. If the indicator is set to a first value, it indicates to the terminal that the terminal or UE shall or is allowed to perform RF retuning (or shall perform a glitch) at cell activation but that it is prohibited from performing an RF retuning (or prohibited to perform a glitch) at cell configuration. If the indicator is set to a second value it indicates to the terminal that the terminal shall perform an RF retuning (or shall perform a glitch) at cell configuration but that it is prohibited from performing an RF retuning (or prohibited to perform a glitch) at cell activation.

This is advantageous in e.g. a scenario where the network node orders or commands in a command message the terminal to activate/deactivate a serving cell often, e.g. to suit the bandwidth resource demand of the terminal which may change fast depending on the terminal's traffic pattern. The terminal may with prior art perform multiple glitches in this scenario which may significantly reduce user experience. However with the method described in this embodiment the network node may indicate to the terminal that the terminal shall perform an RF retuning at cell configuration and that glitches are prohibited at cell activation and hence the terminal will not perform glitches in this scenario.

An additional benefit of indicating to the terminal that it shall perform RF retuning at cell configuration and not perform a glitch at cell activation, is that the terminal will be available for communication with the network also during times of cell activation (note that the terminal may not available be for communication on the serving cell which becomes activated for reasons other than glitches, but cells other than the cell being activated may be available for communication). The network node may then be configured to (continuously) schedule a terminal during cell activation. Furthermore by prohibiting glitches at cell activation the delay of cell activation will be reduced.

Consider the scenario when the network node proactively configures a cell for a terminal but the network node will activate the cell at a later stage. In that case, it may be beneficial if the terminal or UE does not perform the glitch at cell configuration but instead performs the glitch when the cell is activated. The reason for this is that the power consumption of a terminal is expected to be higher the larger bandwidth the terminals transceiver covers. The network node, in this scenario, may be configured to indicate to the terminal that it is prohibited to perform a glitch at cell configuration. If so, the terminal may not perform an RF retuning to cover the bandwidth of the newly configured cell before it becomes activated which will allow for power consumption reduction in the terminal.

According to another exemplary embodiment, the network node is configured to indicate if RF retuning is allowed during cell configuration.

In this exemplary embodiment the network node sends an indicator to the terminal. If the indicator is set to a first value, it indicates to the terminal that the terminal is allowed to perform an RF retuning (or allowed to perform a glitch) at cell configuration. If the indicator is set to a second value it indicates to the terminal that the terminal is prohibited from performing an RF retuning (or prohibited from perform a glitch) glitch at cell configuration.

An advantage of this embodiment is that the terminal will always have the freedom to decide whether or not to perform the RF retuning (or glitch) at cell activation at the same time as the network or network node has the possibility to ensure that the terminal will not perform the RF retuning (or glitch) at cell configuration. For a terminal for which low power consumption is important, it may be beneficial to not perform RF retuning before the cell is be activated because increased bandwidth may increase the power consumption of the terminal. The network node may indicate that such a terminal is prohibited to perform RF retuning at cell configuration. For another terminal for which high throughput and low delays are important it may be beneficial to perform cell configuration as soon as the cell has been configured to enable the possibility that RF retuning has been performed already at the time of cell activation, the network node may then indicate that such a terminal is allowed to perform RF retuning at cell configuration.

In an alternative of this embodiment the indicator may indicate to the terminal that the terminal is allowed to perform RF retunings (or allowed to perform glitches) at both cell configuration and cell deconfiguration in case a first value is indicated by the network and if a second value is indicated by the network the terminal is prohibited from performing RF retunings (or prohibited from performing glitches) at both cell configuration and cell deconfiguration.

In an alternative of this embodiment the indicator may indicate to the terminal that the terminal is allowed to perform RF retunings (or allowed to perform glitches) at both cell activation and cell deactivation in case a first value is indicated by the network and if a second value is indicated by the network the terminal is prohibited from performing RF retunings (or prohibited from performing glitches) at both cell activation and cell deactivation.

In another alternative, the method performed in the network node may include, deciding if the UE is allowed to perform a glitch at cell deactivation or at cell deconfiguration, and that that being, signaling a message to the UE, the message containing an indicator indicating whether the UE shall perform a glitch at cell deactivation or at cell deconfiguration.

If the indicator indicates that the UE is allowed to perform a glitch at cell deactivation the method comprises prohibiting the UE to perform a glitch at deconfiguration.

If the indicator indicates that the UE is allowed to perform a glitch at cell deconfiguration the method comprises prohibiting the UE to perform a glitch at deactivation According to yet another exemplary embodiment, the network node is configured to indicate if RF retuning is allowed during cell activation. If the indicator is set to a first value, it indicates to the terminal that the terminal is allowed to perform an RF retuning (or allowed to perform a glitch) at cell activation. If the indicator is set to a second value it indicates to the terminal that the terminal is prohibited from performing an RF retuning (or prohibited from perform a glitch) glitch at cell activation.

The benefit of this embodiment is that the network node has the possibility ensure that the terminal will not perform the RF retuning (or glitch) at cell activation. If the network foresees that a serving cell will be toggled between being activated and deactivated for a terminal the network may indicate to this terminal that it shall not perform cell RF retuning (or perform a glitch) at cell activation so as to avoid that the terminal performs glitches too often which would degrade user experience. However if a serving cell for a terminal is deactivated and expected to remain deactivated for a relatively long period of time the network node may indicate to the terminal that RF retuning is allowed at cell configuration which will allow the terminal to do RF retuning and decrease the covered bandwidth allowing for power savings in the terminal.

In an alternative of this exemplary embodiment is that the indicator indicates to the terminal that the terminal is allowed to perform RF retunings (or allowed to perform glitches) at both cell activation and cell deactivation in case a first value is indicated by the network and if a second value is indicated by the network the terminal is prohibited from performing RF retunings (or prohibited from performing glitches) at both cell activation and cell deactivation.

Several alternatives for signalling or sending the message containing the above described indicator are described here below.

According to an exemplary embodiment, an indicator maybe broadcasted from the network node in a broadcast message. Different network nodes may broadcast different values of this indicator. It may even be so that different cells offered by one node are broadcast different values of this indicator. An advantage of broadcasting the indicator is that all terminals or UEs which read/receive and/or decode the same broadcast channel will use the same value. Another advantage of this alternative is that signalling overhead may be small. If per terminal control is not important this signalling alternative may be feasible.

According to another exemplary embodiment, an indicator(s) is/are transmitted/signalled to the terminal from the network node, when the terminal performs initial access to the cell/network. This allows the network to signal/transmit/send different indicator values to different UEs. It will with this signalling alternative also be possible to have terminal specific/dedicated signaling which may, for example, be used by the network node to deliver different quality of service for different UEs or treat different types of terminals differently or treat terminals differently depending on the scenario as in the examples given previously.

According to yet another exemplary embodiment, the network node (e.g. eNB, eNodeB, NodeB) is configured to signal/send the indicator on a per need basis. For example, if a terminal initially does not require high throughput and low delays where low power consumption is important it may not be configured so that it will be performing RF retunings ensuring as small covered bandwidth as possible, e.g. by indicating that the terminal should perform RF retuning upon configuration and deconfiguration. At a later stage it may be more important with high throughput and low delay than low power consumption. In such case the network may indicate that the terminal shall refrain from performing RF retunings at cell activation/deactivation.

Also this alternative allows for terminal specific indicators which bring the benefits as described above. On top of terminal specific indicators this signaling alternative also allows to change the indicator depending on the current situation, i.e. it can be changed over time.

According to another exemplary embodiment the eNB or network node is configured to signal the indicator in the same message, or in a compound message, as the message which orders the UE. This signaling alternative is very flexible as the network node may indicate to the terminal different behaviors for different serving cells. I.e. maybe it is wanted that the terminal performs RF retuning at cell activation of one cell but it is wanted that the terminal performs RF retuning at cell configuration of another cell.

Also this alternative allows for terminal specific indicators and situation dependent indicators which bring the benefits as described previously.

According to yet another exemplary embodiment, a combination of multiple signalling alternatives is supported. In other words, multiple of the above mentioned signalling alternatives may be supported. The terminal may be configured to have different priorities for the different signalling alternatives. One foreseen alternative is that the below priority order is used where the value 1) indicates highest priority and the value 4) the lowest priority.

1) Indicator signaled/transmitted in cell configuration message
2) Indicator signaled/transmitted on demand
3) Indicator signaled/transmitted during initial access
4) Broadcasting of indicator If the terminal has received more than one of these indicators the terminal will follow the received indicator with the highest priority.

With the solutions described here the network node may control when a terminal is performing an RF retuning, i.e. during the cell configuration or the cell activation. It is the network node which is in control over the cell configuration and cell activation for a terminal it is also expected that the network node is well suited to control if a terminal shall perform the RF retuning at cell configuration or cell activation.

Some embodiments described herein also allow for sharing control between the network node and the terminal of when the terminal shall perform RF retuning.

The scheduler in the network avoids scheduling resources to a terminal or UE when the terminal is performing a glitch or RF retuning. This is because the network node controls the glitch behaviour of the UE.

Also if the network node knows that a terminal or UE is refraining or prohibited from performing a glitch that terminal may be scheduled. This will improve user experience by increasing throughput, reducing delay and avoiding service interruption. According to some embodiments terminal specific control is also possible which increases the flexibility and also may be used to enable the most appropriate behaviour for each terminal.

Figure 6:
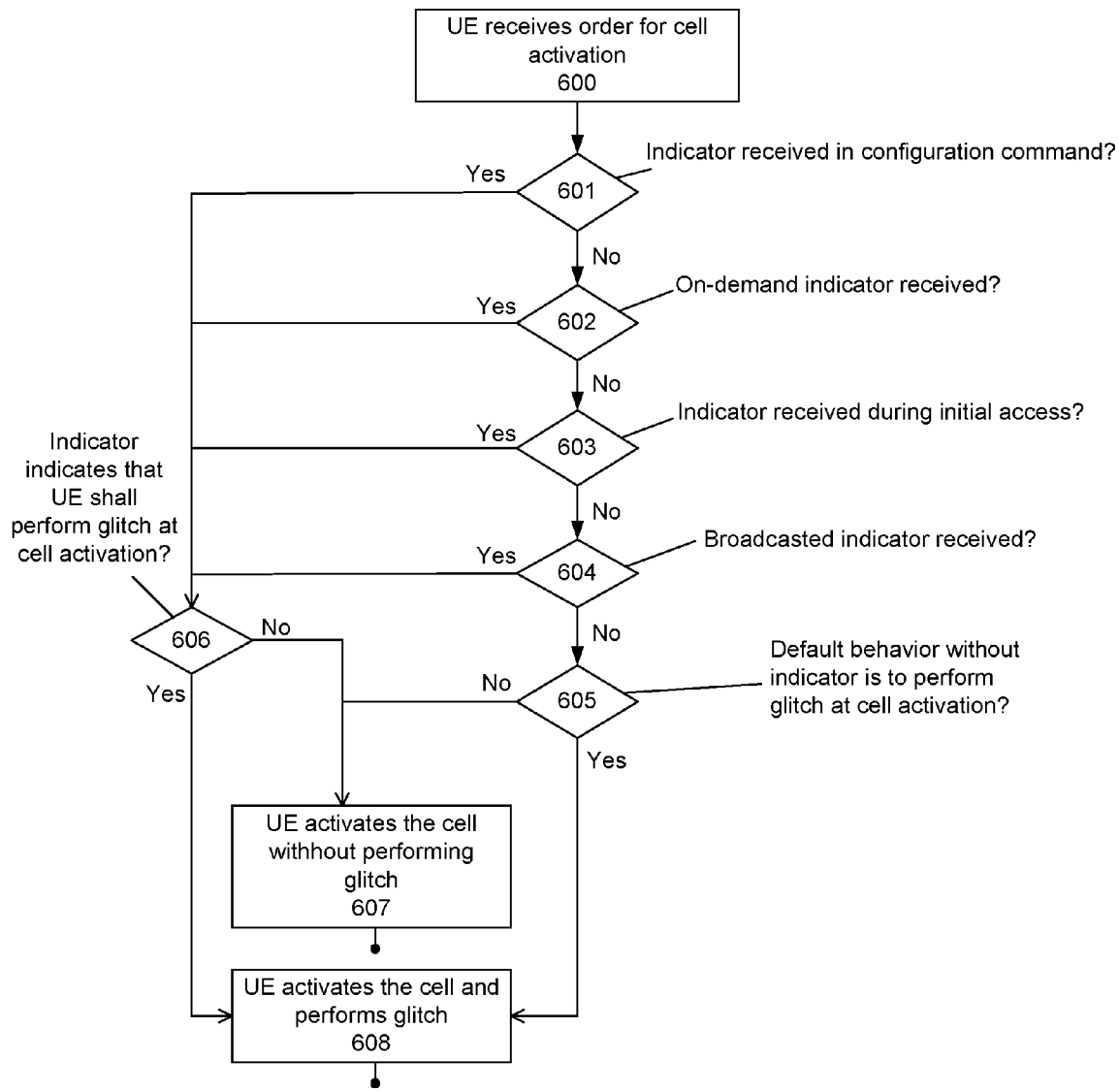
FIG. 6 is a flowchart illustrating example operations, according to some exemplary embodiments presented herein.

FIG. 6 depicts example operations, according to some exemplary embodiments presented herein. In this example, it is considered the exemplary case where the UE receives an order for cell activation 600. The order is received in a message from a network node. Further it is determined whether an indicator is received and based on that, actions are performed, as will be explained below. As indicated above, FIG. 6 shows the exemplary case where the order received is for cell activation. However, as previously described, the order received may be for cell configuration.

As shown, different alternatives are possible upon reception of the order. For each alternative it is determined whether or not the received order contains an indicator.

If an indicator is received in a configuration command 601, the UE determines whether the indicator indicates that the UE shall perform a glitch at cell activation 606. If so, ("YES"), the terminal activates the cell 608 and performs the glitch, otherwise ("NO"), the UE activates the cell without performing a glitch 607.

If, instead, an on-demand indicator is received 602, the UE determines whether the indicator indicates that the UE shall a glitch at cell activation 606. If so, ("YES"), the terminal activates the cell 608 and performs the glitch, otherwise ("NO"), the UE activates the cell without performing a glitch 607.

If, instead, an indicator is received during initial access 603, the UE determines whether the indicator indicates that the UE shall a glitch at cell activation 606. If so, ("YES"), the terminal activates the cell 608 and performs the glitch, otherwise ("NO"), the UE activates the cell without performing a glitch 607.

If, instead, an indicator is broadcasted 604, the UE determines whether the indicator indicates that the UE shall a glitch at cell activation 606. If so, ("YES"), the terminal activates the cell 608 and performs the glitch, otherwise ("NO"), the UE activates the cell without performing a glitch 607.

If no indicator is received in the order, a default behaviour may be performed 605, to perform a glitch at cell activation or to activate the cell without performing the glitch as shown in FIG. 6.

Figure 7:
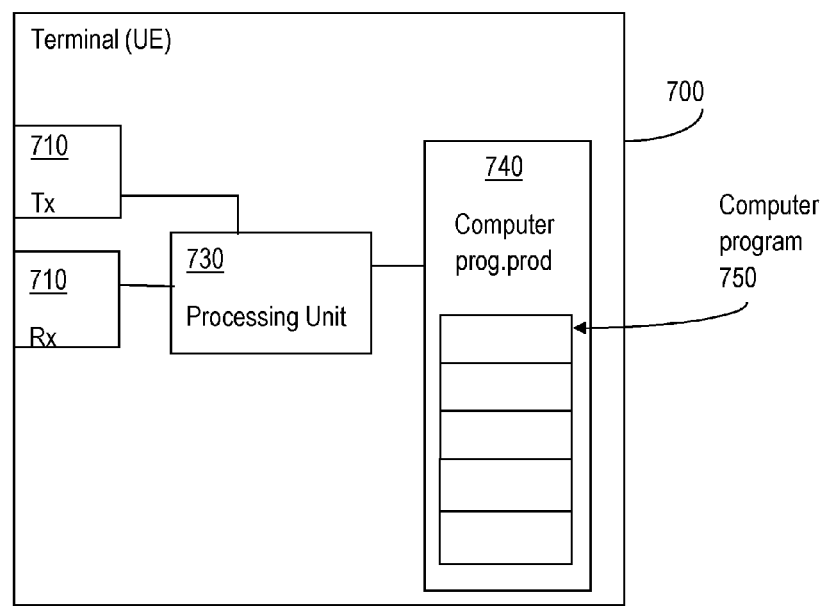
FIG. 7 is a block diagram illustrating an example of a terminal or a UE according to an exemplary embodiment.

FIG. 7 is an example configuration of a UE or terminal 700 according to some of the example embodiments presented herein. The example UE 700 is shown comprising processing circuitry 730 and radio circuitry 710 Rx/Tx. The UE 700 may further comprise a memory (not shown) and at least one antenna (not shown) connected to Rx/Tx. The radio circuitry may comprise RF circuitry and baseband processing circuitry (not shown). In embodiments, some or all of the functionality described above as being provided by mobile communication devices or other forms of wireless device may be provided by the processing circuitry 730 executing instructions or a computer program 750 stored on a computer-readable medium of a computer program product 740. Alternative embodiments of the UE may comprise additional components responsible for providing additional functionality, comprising any of the functionality identified above and/or any functionality necessary to support the example embodiments described herein.

It should be appreciated that the processing circuitry (or any other hardware and/or software unit configured to execute operations and/or commands) of the UE may be configured to perform the previously described embodiment.

In summary, the transceiver 710 of UE 700 is configured to receive/acquire/obtain a message from a network node. The processing circuitry 730 is configured to determine if the received message contains at least one indicator indicating to the UE 700 if/whether the UE is allowed to perform a glitch at cell activation or at cell configuration, and that being the case, the processing circuitry 730 is configured to perform a glitch at cell activation or at cell configuration depending on the indication in the received message.

The processing circuitry 730 may be configured to determine or identify a value of the at least one indicator and further configured to act as a result of the determination or identification.

As previously described, the received message may be a RRC message containing an indicator flag corresponding to the indicator as shown in previously described Example 1. If the indicator indicates that the UE 700 shall perform a glitch as cell configuration, the UE 700 is prohibited from performing a glitch at cell activation. Instead, if the indicator indicates that the UE 700 shall perform a glitch as cell activation, the UE 700 is prohibited from performing a glitch at cell configuration.

The processing circuitry 730 may be configured to determine if the received message contains at least one indicator indicating to the UE 700 if/whether the UE is allowed to perform a glitch at cell deactivation or at cell deconfiguration, and that being the case, the processing circuitry 730 is configured to perform a glitch at cell deactivation or at cell deconfiguration depending on the indication in the received message.

If the indicator indicates that the UE 700 shall perform a glitch as cell deconfiguration, the UE 700 is prohibited from performing a glitch at cell deactivation. Instead, if the indicator indicates that the UE 700 shall perform a glitch as cell deactivation, the UE 700 is prohibited from performing a glitch at cell deconfiguration.

Other operations performed by the UE have already been described and need not be repeated.

Figure 8:
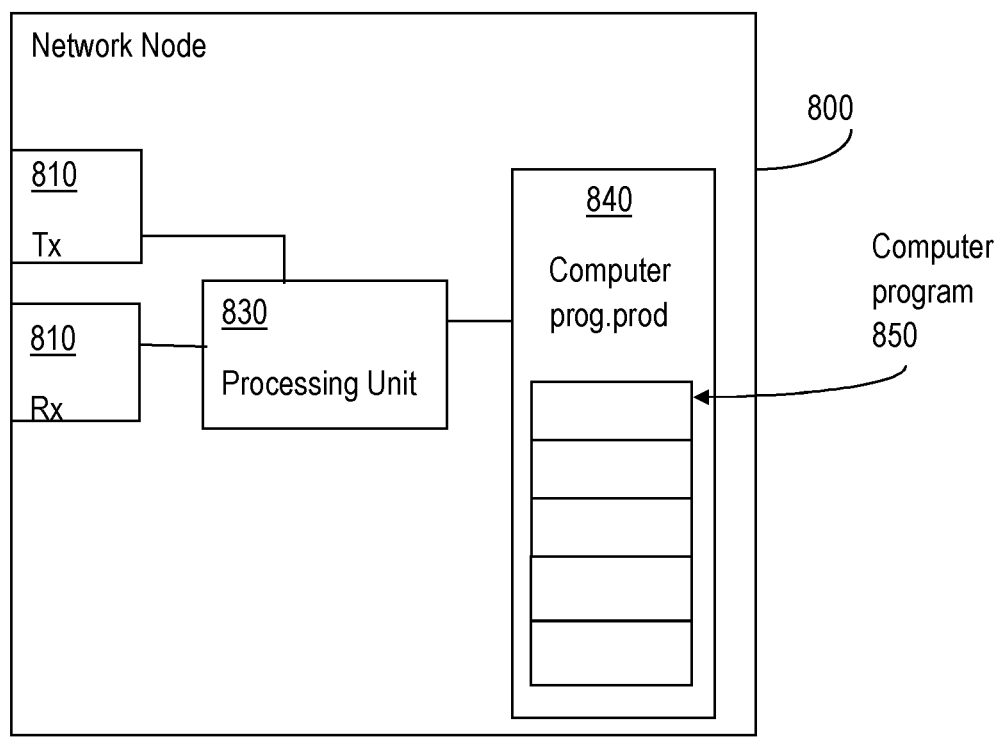
FIG. 8 is a block diagram illustrating an example of a network node according to an exemplary embodiment.

FIG. 8 is an example configuration of a network node 800 (eNB or eNodeB or NodeB) according to some of the example embodiments presented herein, for controlling glitch behaviour of a UE or terminal. The example network node 800 comprises processing circuitry 830, a memory (not shown), radio circuitry 810 Rx/Tx or transceiver, and at least one antenna (not shown) connected to Rx/Tx. The radio circuitry may comprise RF circuitry and baseband processing circuitry (not shown). In embodiments, some or all of the functionalities described above as being provided by the processing circuitry 830 executing instructions or a computer program 850 stored on a computer-readable medium of a computer program product 840. Alternative embodiments of the network node 800 may comprise additional components responsible for providing additional functionality, comprising any of the functionality identified above and/or any functionality necessary to support the example embodiments described herein.

It should be appreciated that the processing circuitry (or any other hardware and/or software unit configured to execute operations and/or commands) of the network node may be configured to perform the previously described embodiments.

In summary, the processing circuitry 830 and/or the transceiver circuitry 810, being configured to decide if the UE or terminal shall perform a glitch at cell activation or at cell configuration and the transceiver 810 is configured to send/signal a message to the UE, the message containing at least one indicator indicating whether the UE shall perform a glitch at cell activation or at cell configuration.

As explained before, the network node 800 may be configured to prohibit the UE from performing a glitch at cell configuration if the indicator indicates that the UE is allowed to perform a glitch at cell activation. The network node 800 may also be configured to prohibit the UE to perform a glitch at cell activation if the indicator indicates that the UE is allowed to perform a glitch at cell configuration.

The message comprising the indicator(s) may be sent in a RRC message. For example, an indicator flag corresponding to the indicator The network node 800 or the transceiver may signal the message containing the indicator, in a broadcast message or on demand or during initial access of the UE to the cell.

As previously described several advantages are achieved with the embodiments.

An advantage achieved is to allow the network node to control when a terminal is performing an RF retuning, i.e. during the cell configuration or the cell activation. It is the network node which is in control over the cell configuration and cell activation for a terminal it is also expected that the network is well suited to control if a terminal shall perform the RF retuning at cell configuration or cell activation.

Another advantage is to know when the terminal shall perform RF retuning. An advantage with this is to avoid scheduling a terminal during the RF retuning.

Also if the network node knows that a terminal is refraining from performing the glitch that terminal or UE can be scheduled. This will improve user experience by increasing throughput, reducing delay and avoiding service interruption.

Other operations performed by the network node have already been described and need not be repeated.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method performed in a user equipment, UE, for performing an interruption, the method comprising:
   notifying a network node that the UE has performed an interruption at one of cell activation and cell configuration; and
   receiving a notification from the network node that the UE will be scheduled for communication during the other of the one of cell activation and cell configuration.

2. The method of claim 1, further comprising if the UE has performed the interruption at cell configuration, the UE is prohibited from performing an interruption at cell activation.

3. The method of claim 1, further comprising if the UE has performed the interruption at cell activation, the UE is prohibited from performing an interruption at cell configuration.

4. The method of claim 1, further comprising:
   receiving, from the network node, a message, the message including an indicator indicating whether the UE is allowed to perform an interruption at one of cell activation and at cell configuration; and
   if the indicator indicates that the UE is allowed to perform the interruption at one of cell deactivation and at cell deconfiguration, performing the interruption at the one of cell deactivation and at cell deconfiguration depending on the indication in the received message.

5. The method of claim 4, further comprising if the indicator indicates that the UE shall perform an interruption at cell deactivation, the UE is prohibited from performing an interruption at cell deconfiguration.

6. The method of claim 4, further comprising if the indicator indicates that the UE shall perform an interruption at cell deconfiguration, the UE is prohibited from performing an interruption at cell deactivation.

7. The method of claim 4, wherein the message is a radio resource control, RRC, the message comprising an indicator flag corresponding to said indicator.

8. A method performed in a network node for controlling interruption behavior of a user equipment, UE, the method comprising:
   determining if the UE has performed an interruption at one of cell activation and at cell configuration;
   determining that the UE does not perform an interruption during the other of the one of cell activation and cell configuration; and
   scheduling the UE for communication during the other of the one of cell activation and cell configuration.

9. The method of claim 8, further comprising prohibiting the UE to perform an interruption at cell configuration if the UE performed an interruption at cell activation.

10. The method of claim 8, further comprising prohibiting the UE to perform an interruption at cell activation if the UE performed an interruption at cell configuration.

11. The method of claim 8, wherein the determining comprises:
    determining if the UE is allowed to perform an interruption at one of cell deactivation and at cell deconfiguration; and
    if the UE is allowed to perform an interruption at one of cell deactivation and at cell deconfiguration, signaling a message to the UE, the message containing an indicator indicating whether the UE shall perform the interruption at the one of cell deactivation and at cell deconfiguration.

12. The method of claim 11, further comprising prohibiting the UE to perform an interruption at deconfiguration if the indicator indicates that the UE is allowed to perform an interruption at cell deactivation.

13. The method of claim 11, further comprising prohibiting the UE to perform an interruption at cell deactivation if the indicator indicates that the UE is allowed to perform an interruption at cell deconfiguration.

14. The method of claim 11, wherein the message is a radio resource control, RRC, message comprising an indicator flag corresponding to said indicator.

15. The method of claim 11, comprising signaling the message containing the indicator, in one of a broadcast message, on demand and during initial access of the UE to the cell.

16. A user equipment, UE, for performing an interruption, the UE comprising:
    processing circuitry configured to perform an interruption at one of cell activation and at cell configuration; and a transceiver configured to:
    notify a network node that the UE has performed the interruption at one of cell activation and cell configuration; and
    receive a notification from the network node that the UE will be scheduled for communication during the other of the one of cell activation and cell configuration.

17. The UE of claim 16 wherein the processing circuitry is configured to prohibit performing an interruption at cell activation if the UE has performed the interruption at cell configuration.

18. The UE of claim 16 wherein the processing circuitry is configured to prohibit performing an interruption at cell configuration if the UE has performed an interruption at cell activation.

19. The UE of claim 16, wherein the transceiver is further configured to receive, from the network node, a message, the message including an indicator indicating whether the UE is allowed to perform an interruption at one of cell activation and at cell configuration, the received message being a radio resource control, RRC, message containing an indicator flag corresponding to said indicator; and
    if the indicator indicates that the UE is allowed to perform the interruption at one of cell deactivation and at cell deconfiguration:
    the processing circuitry is further configured to perform the interruption at the one of cell deactivation and at cell deconfiguration depending on the indication in the received message.

20. A network node for controlling interruption behavior of a user equipment, UE, the network node comprising:
    processing circuitry; and
    a transceiver;
    the processing circuitry configured to:
        determine if the UE has performed an interruption at one of cell activation and at cell configuration;
        determine that the UE does not perform an interruption during the other of the one of cell activation and cell configuration; and
        schedule the UE for communication during the other of the one of cell activation and cell configuration.

21. The network node of claim 20, wherein the processing circuitry is further configured to prohibit the UE from performing an interruption at cell configuration if the UE performed an interruption at cell activation.

22. The network node of claim 20, wherein the processing circuitry is further configured to prohibit the UE from performing an interruption at cell activation if the UE performed an interruption at cell configuration.

23. The network node of claim 20, wherein the determining comprises:
    determining if the UE is allowed to perform an interruption at one of cell deactivation and at cell deconfiguration; and
    if the UE is allowed to perform an interruption at one of cell deactivation and at cell deconfiguration:
        the transceiver is configured to signal a message to the UE, the message containing an indicator indicating whether the UE shall perform the interruption at the one of cell deactivation and at cell deconfiguration, the message being a radio resource control, RRC, message comprising an indicator flag corresponding to said indicator.

24. The network node of claim 23, wherein the transceiver is configured to signal the message containing the indicator, in one of a broadcast message, on demand and during initial access of the UE to the cell.

* * * * *